A. LOMEN.
HAY LOADER.
APPLICATION FILED APR. 29, 1910.
1,096,043.
Patented May 12, 1914.
3 SHEETS—SHEET 3.
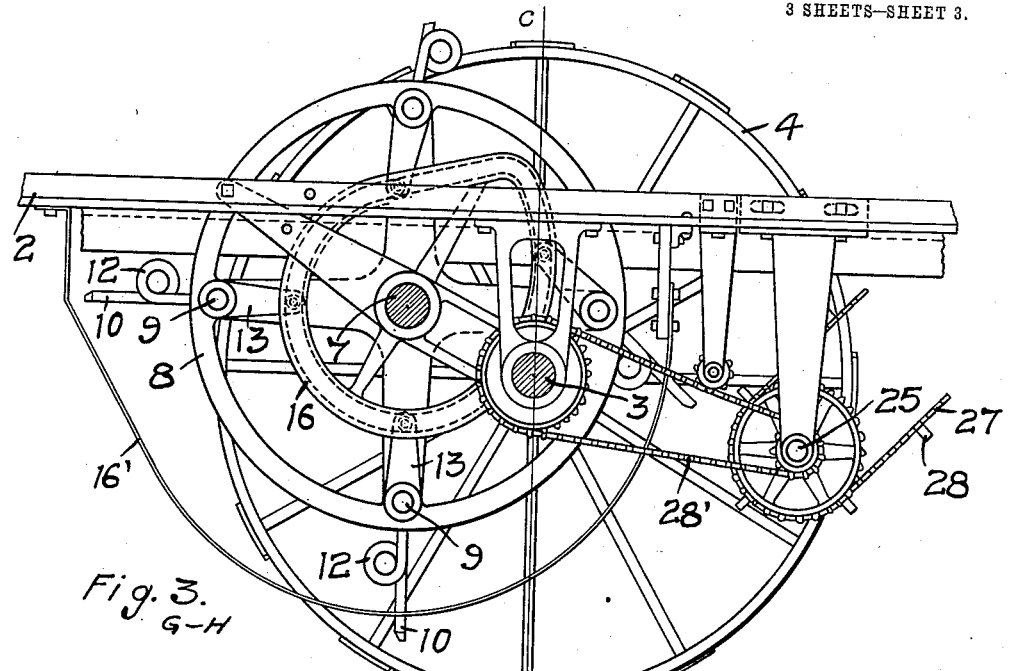
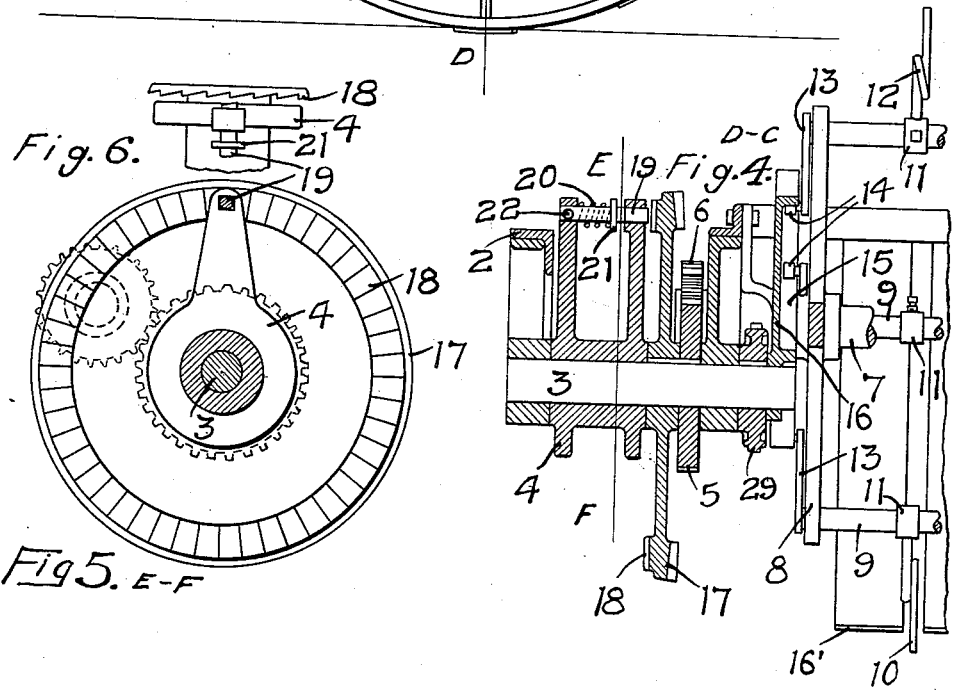
WITNESSES:
INVENTOR:
ANTON LOMEN
BY
ATTORNEY.

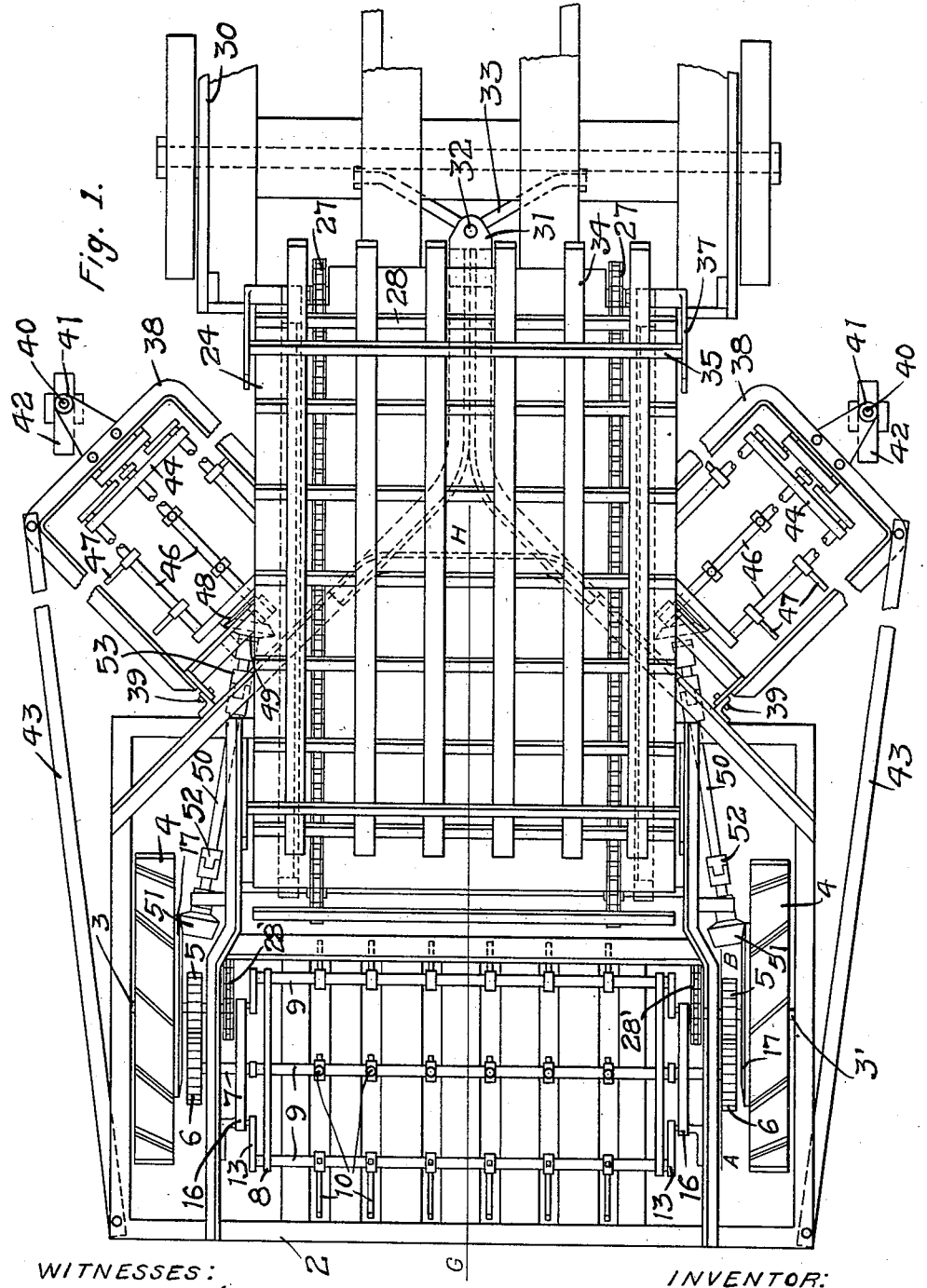

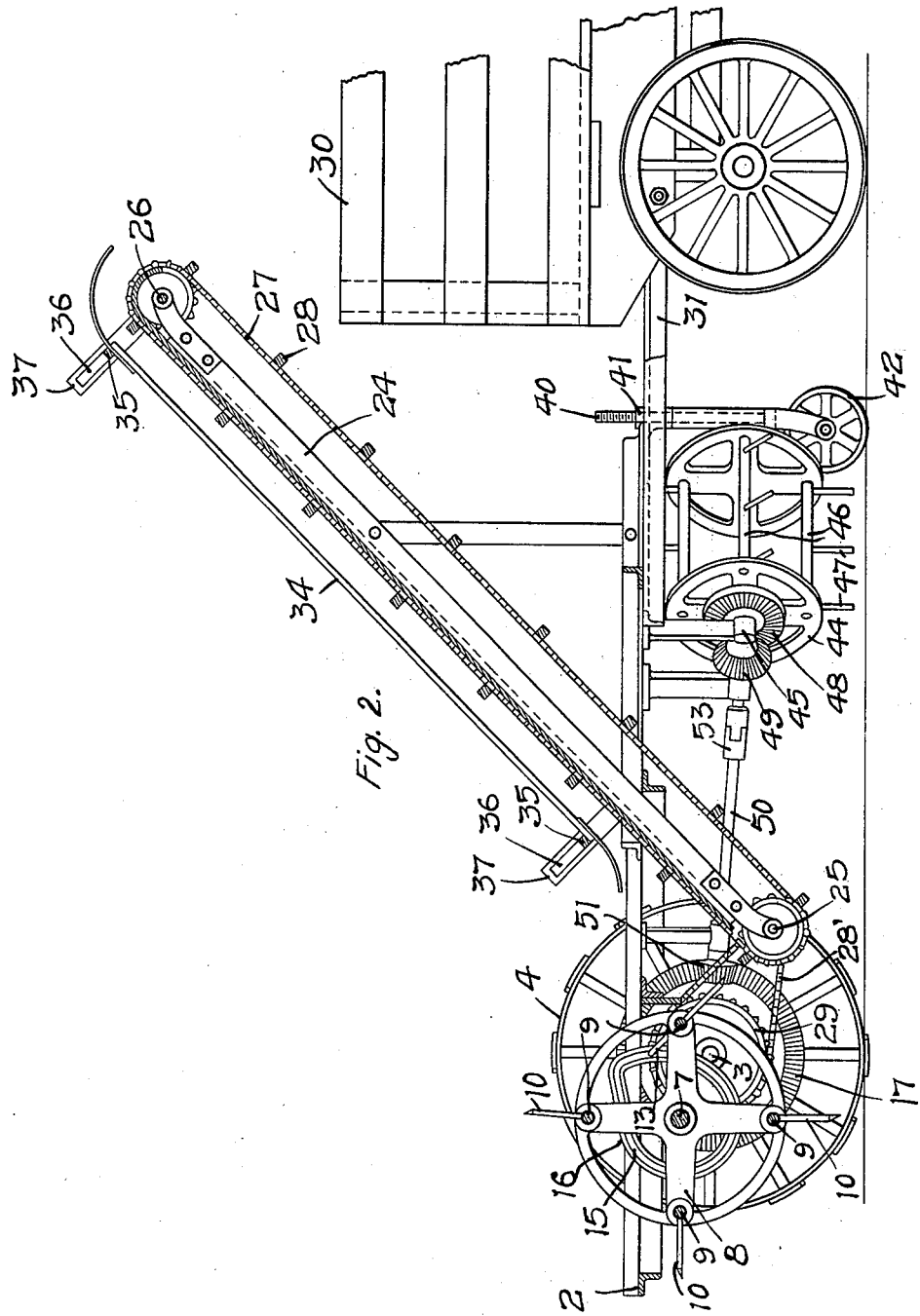

UNITED STATES PATENT OFFICE.

ANTON LOMEN, OF CARPENTER, IOWA.

HAY-LOADER.

1,096,043.

Specification of Letters Patent.　　Patented May 12, 1914.

Application filed April 29, 1910.　Serial No. 558,508.

*To all whom it may concern:*

Be it known that I, ANTON LOMEN, of Carpenter, Mitchell county, Iowa, have invented certain new and useful Improvements in Hay-Loaders, of which the following is a specification.

My invention relates to machines for loading hay or grain into a rack or wagon and the object of the invention is to provide an apparatus by means of which the loose hay or grain can be gathered up from the ground and loaded easily and rapidly.

A further object is to provide an apparatus of simple construction and one which can be easily attached to any type of rack or wagon.

In the accompanying drawings forming part of this specification, Figure 1 is a plan view of a hay loading machine embodying my invention, Fig. 2 is a vertical sectional view of the same, Fig. 3 is a sectional view taken on the line G—H of Fig. 1, Fig. 4 is a detail sectional view on the line D—C of Fig. 3, Fig. 5 is a sectional view on the line E—F of Fig. 4, Fig. 6 is a detail view of the ratchet mechanism.

In the drawing, 2 represents a frame, substantially rectangular in form, 3 and 3' are short shafts on which carrying wheels 4 are loosely mounted.

5 is a gear keyed on the shaft 3 and meshing with a similar gear 6 that is secured to a shaft 7. This shaft supports a frame 8 wherein a series of peripheral shafts 9 are journaled. These shafts 9 carry a series of hay pick-up fingers 10, adjustable on the shaft 9 by means of collars 11 and loops or coils 12 are formed in these fingers to allow them to yield lengthwise when coming in contact with the ground and also give them a spring effect. I have shown four of the shafts 9 with a series of fingers on each one, but this number may be increased or decreased, as preferred. Each shaft 9 has a crank 13 on one end provided with an anti-friction roller 14 that is adapted to enter a cam track 15 provided in a disk 16. The revolution of the drum and the connection of the shafts 9 with the cam track will cause the shafts to be rocked and the fingers swung to a position at right angles substantially to said drum to gather up the hay or other material, and then tilted downwardly as the fingers pass the receiving end of the elevator to allow the fingers to free themselves from the gathered material.

I regard the tilting of the pick-up fingers at the point where they discharge their load as an important feature of my invention, as it enables me to free the fingers from the hay or other material and at the same time dispense with a considerable portion of the mechanism usually found necessary for moving the fingers to the operative or inoperative position. I have found that fingers arranged to tilt in the manner shown in Fig. 2 will positively discharge the load upon the elevator, while if they are held in a position substantially at right angles to their support, even though they are retracted a considerable distance they will not always free themselves from the hay or other material.

A series of guards 16' is provided, between which the fingers operate and these guards serve to clean the hay off the fingers as the drum revolves. A beveled gear 17 is keyed on the shaft 3 and has ratchet teeth 18 adapted to be engaged by pins 19 which are mounted in the carrying wheels and are normally projected into engagement with the ratchet teeth by springs 20. The pins are limited in their movement toward the ratchet by stops 21, and holes 22 are provided in said pins in which plugs may be inserted to lock the pins into engagement with the teeth of the ratchet or out of engagement therewith. When the pins engage the ratchet teeth, the revolution of the wheels will drive the gear 17 and the shafts 3 and the mechanism connected therewith.

Any suitable mechanism, which I have not thought necessary to illustrate, may be employed for moving the ratchet pins back and forth in their bearings in the wheels. Obviously, when these pins are in their retracted position, the wheels will turn loosely on the axles and the operating mechanism of the machine will be at rest. When the pins are in their working position the operating mechanism of the machine will be driven and the pins will slide over the teeth of the ratchets during the backward movement of the machine.

An inclined frame 24 is arranged in front of the pick-up drum having shafts 25 and 26 mounted therein and supporting an elevating belt 27 having slats 28 thereon at intervals. This belt is driven by drive belts 28' and sprocket wheels 29 keyed on the shaft 3. The upper end of the frame 24 is adapted to overhang the rear portion of a rack 30, to which the loader frame is preferably connected by means of a draft tongue 31, which is pivotally connected at 32 to a yoke 33 that is journaled at its ends in the rear of the wagon. The pick-up frame has an underfeed, the fingers gathering up the hay and feeding it upward to the lower or receiving end of the elevating belt, and as the pick-up fingers move upwardly to deliver the hay they will be drawn in toward the periphery of the drum by the rotary action of the shafts 9 and their connections with the cam track. Thus when the fingers reach the upper side of the drum they will be disengaged completely from the hay or grain, the guards preventing the material from following the fingers and from winding around the axis of the drum. Above the elevator I provide a rack 34 adapted to bear on the hay or grain and having bars 35 at each end that are vertically slidable in slots 36 in the standards 37 and may be adjusted toward or from the elevator as desired.

The revolving drum will have the effect of gathering the hay or grain and feeding it upwardly under the drum to the elevator and for the purpose of providing a windrow or considerable quantity of hay in the path of the drum I prefer to provide a side feeding means operating diagonally with respect to the direction of movement of the machine to feed the material toward the center where it will be gathered up by the drum. The feeding means consists of frames 38 pivoted at 39 on the machine frame and capable of vertical adjustment by means of rods 40 having threaded upper ends and adjusting nuts 41 and provided at their lower ends with caster wheels 42. Bars 43 connect the outer portions of the frames 38 with the rear of the frame 2. Within the frame 38 drums 44 are mounted in bearings 45 and provided with rods 46 having fingers 47. Beveled gears 48 are arranged on the ends of the drums meshing with pinions 49 on shafts 50 which have pinions 51 meshing with the gear 17. The shafts 50 have universal joints 52 and 53 which allow the shafts to adapt themselves to the position of the frames 38 and to the inequalities of the ground over which the side feed gatherers are moving.

In the operation of the machine, a driving connection having been made through the pin 19 and the gear 18, all the parts of the machine will be set in operation and the side feed drums will deliver the hay toward the middle of the machine in the path of the rear drum, the fingers of which will gather up the row and direct it upon the inclined elevator. The upper portion of the elevator will overhang the rack and the material gathered up on the elevator will be discharged thereby into the rack or wagon.

In various ways the details of construction herein shown may be modified, such as the driving mechanism for the rear drum and its fingers, without departing from the spirit of my invention.

I claim as my invention:—

1. A hay loader comprising a frame having carrying wheels, an inclined elevator, a drum having pick-up fingers in the rear of said elevator, and side feed devices including revolving drums rotating in a vertical plane and located at opposite sides of the elevator at an angle to the draft line and in a plane below the elevator and having pick-up fingers to direct hay or grain into the path of said drum located between said side feed devices and the lower end of the elevator.

2. A hay loader comprising a frame having carrying wheels, a forwardly and upwardly inclined elevator, a pick-up drum in the rear of said elevator, frames pivoted to swing in a vertical plane on each side of said carrying frame, revolving drums journaled in said frames to rotate in a vertical plane at an angle to the draft line, driving connections between said carrying wheels and said drums, said side drums having pick-up fingers, and means for adjusting said side feed drums to vary the distance of their fingers from the work.

3. A hay loader comprising a frame having carrying wheels, a forwardly and upwardly inclined elevator mounted in said frame, a pick-up drum in the rear of said elevator, frames pivoted on each side of said carrying frame, revolving drums journaled in said side frames and having pick-up fingers, driving connections between said carrying wheels and said drums operating them in a direction at an angle to the draft line, rods having threaded connections with said side frames and caster wheels at their lower ends, said threaded connections permitting the vertical adjustment of said frames on said rods to increase or decrease the distance of said frames and their drums with respect to the ground line.

4. The combination with a frame having carrying wheels, of a forwardly and upwardly inclined elevator, a drum having pick-up fingers in the rear of said elevator, side frames having pivotal connections with said first named frame to swing in a vertical plane, drums mounted in said side frames to rotate in a vertical plane and having pick-up fingers thereon, shafts having driving connections with said carrying wheels and with said frames, and means to rest on the ground and support the outer portions of said side frames.

5. The combination with a frame having carrying wheels, of a drum having pick-up fingers, side frames attached to said first named frame and mounted to swing in a vertical plane, drums having pick-up fingers mounted in said side frames diagonally with respect to the draft line and rotating in a vertical plane, a positive driven connection between said carrying wheels and said side-frame drums, means to rest upon the ground and support the outer portions of said swinging side frames, and bracing means connecting said side frames and said first named frame.

In witness whereof, I have hereunto set my hand this 25th day of April, 1910.

ANTON LOMEN.

Witnesses:
M. R. ODEGAARD,
NELLIE REIERSON.

Copies of this patent may be obtained for five cents each, by addressing the "Commissioner of Patents, Washington, D. C."